United States Patent
Bae et al.

(10) Patent No.: US 7,583,696 B2
(45) Date of Patent: *Sep. 1, 2009

(54) SYSTEM AND METHOD FOR DIGITAL BROADCAST PROTOCOL CONVERSION

(75) Inventors: Byungjun Bae, Daejeon (KR);
Joon-Young Choi, Daejeon (KR);
Jinhwan Lee, Daejeon (KR);
Young-Kwon Hahm, Daejeon (KR);
Chieteuk Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1116 days.

This patent is subject to a terminal disclaimer.

(21) Appl. No.: 10/286,315

(22) Filed: Nov. 1, 2002

(65) Prior Publication Data

US 2003/0234890 A1 Dec. 25, 2003

(30) Foreign Application Priority Data

Jun. 20, 2002 (KR) ........................ 10-2002-0034535

(51) Int. Cl.
*H04J 3/00* (2006.01)
(52) U.S. Cl. .................... 370/466; 370/395.64; 370/485
(58) Field of Classification Search ................. 370/536, 370/532–534, 486, 395.64, 535, 537, 466, 370/467; 725/68, 140, 9, 119, 95, 135, 32; 348/553

See application file for complete search history.

(56) References Cited

U.S. PATENT DOCUMENTS

| | | | | |
|---|---|---|---|---|
| 5,818,935 | A | * 10/1998 | Maa ........................... | 380/200 |
| 6,101,195 | A | * 8/2000 | Lyons et al. ................. | 370/498 |
| 6,122,015 | A | * 9/2000 | Al-Dhahir et al. ........... | 348/614 |
| 6,233,253 | B1 | 5/2001 | Settle et al. | |
| 2003/0081686 | A1 | * 5/2003 | Jung et al. .................... | 725/68 |
| 2004/0017831 | A1 | * 1/2004 | Shen et al. .................. | 370/486 |
| 2006/0064716 | A1 | * 3/2006 | Sull et al. ..................... | 725/37 |
| 2006/0150231 | A1 | * 7/2006 | Kim et al. ................... | 725/118 |

FOREIGN PATENT DOCUMENTS

EP 1056279 11/2000

(Continued)

OTHER PUBLICATIONS

"Transmultiplexing, Transcontrol and Transscrambling of MPEC-2/DVB Signal", Bungum, Int'l Broadcasting Convention, London, GB, Sep. 12, 1996, pp. 288-293.

*Primary Examiner*—Ian N Moore
(74) *Attorney, Agent, or Firm*—Blakely, Sokoloff, Taylor & Zafman

(57) ABSTRACT

A digital broadcast protocol conversion system including: a PSIP/PSI extractor for demultiplexing a transport stream of an ATSC broadcast standard to extract PSIP/PSI data; an SI/PSI extractor for demultiplexing a transport stream of a DVB broadcast standard to extract SI/PSI data; a protocol converter for converting the PSIP/PSI data to SI'/PSI' data corresponding to a broadcast protocol of the DVB broadcast standard or converting the SI/PSI data to PSIP'/PSI' data corresponding to a broadcast protocol of the ATSC broadcast standard; and a multiplexer for multiplexing the SI'/PSI' data and the transport stream having the PSIP/PSI data extracted therefrom, or multiplexing the PSIP'/PSI' data and the transport stream having the PSIP/PSI data extracted therefrom, thereby converting the broadcast protocol between different broadcast standards.

8 Claims, 4 Drawing Sheets

| | FOREIGN PATENT DOCUMENTS | | | | |
|---|---|---|---|---|---|
| KR | 010010109 | 2/2001 | WO | WO 01/65831 | 9/2001 |
| KR | 1020020014255 | 2/2002 | WO | WO 01/97526 | 12/2001 |
| WO | WO 98/16067 | 4/1998 | | | |

* cited by examiner

SYSTEM AND METHOD FOR DIGITAL BROADCAST PROTOCOL CONVERSION

BACKGROUND OF THE INVENTION (a) Field of the Invention

The present invention relates to a system for digital broadcast protocol conversion.

(b) Description of the Related Art

European countries and the Unites States have respectively adopted ATSC (Advanced Television Systems Committee) and DVB (Digital Video Broadcasting) digital broadcast standards, and hence they use different broadcast protocols for transmission of broadcasting programs and system information. As the broadcast protocol depends on the broadcast system, contents produced in a specific standard cannot be used in a broadcast system of a different standard in the case of full-scale digital broadcasts.

In a broadcast system of the ATSC broadcast standard, broadcast programs and system information including electronic program guide (EPG) information and channel information are transmitted by way of MPEG (Motion Picture Experts Group) PSI (Program Specific Information) and PSIP (Program and System Information Protocol) based on the ATSC A/65 standard. Contrarily, in a broadcast system of the DVB broadcast standard, broadcast programs and system information are transmitted by MPEG PSI and SI (System Information) based on the DVB EN 300 468 standard. For conversion of the broadcast protocol between ATSC and DVB, therefore, PSIP, PSI, and SI tables have to be converted according to the system standard.

SUMMARY OF THE INVENTION

It is an object of the present invention to provide a system for conversion between the PSIP broadcast protocol of an ATSC broadcasting system and the SI broadcast protocol of a DVB broadcasting system.

To achieve the object of the present invention, the present invention is directed to extracting a broadcast protocol from a transport stream and converting and multiplexing the extracted broadcast protocol.

In one aspect of the present invention, there is provided a system for digital broadcast protocol conversion that includes a first protocol extractor for demultiplexing a transport stream of an ATSC broadcast standard to extract first PSIP/PSI data as a broadcast protocol; and a second protocol extractor for demultiplexing a transport stream of a DVB broadcast standard to first SI/PSI data as a broadcast protocol. The first PSIP/PSI data and the first SI/PSI data are transferred to a protocol converter. The protocol converter converts the first PSIP/PSI data to second SI/PSI data corresponding to a broadcast protocol of the DVB broadcast standard, or converts the first SI/PSI data to second PSIP/PSI data corresponding to a broadcast protocol of the ATSC broadcast standard. A multiplexer multiplexes the second SI/PSI data and the transport stream having first PSIP/PSI data extracted therefrom, or multiplexes the second PSIP/PSI data and the transport stream having the first SI/PSI data extracted therefrom.

Preferably, the system further includes a transport stream analyzer for receiving the transport stream of the ATSC or DVB broadcast standard to determine a broadcast protocol conversion pattern, and sending the transport stream to the first or second protocol extractor.

The system further includes a controller for controlling a data transport path according to the broadcast protocol conversion pattern determined by the transport stream analyzer. The data transport path includes a path for sending the transport stream from the transport stream analyzer to the first or second protocol extractor, a path for sending the first PSIP/PSI data or the first SI/PSI data from the first or second protocol extractor to the protocol converter, and a path for sending the second SI/PSI data or the second PSIP/PSI data from the first or second protocol extractor to the multiplexer.

The protocol converter further includes a database for storing the first PSIP/PSI data and the first SI/PSI data. Preferably, the protocol converter further includes PSIP, SI, and PSI reconstructors for respectively reconstructing PSIP, SI, and PSI data from the first PSIP/PSI data and the first SI/PSI data stored in the database. Thus the protocol converter further includes a GUI (Graphic User Interface) receiver for receiving use data necessary for reconstruction of the PSIP, SI, and PSI data.

In a second aspect of the present invention, there is provided a method for digital broadcast protocol conversion. The digital broadcast protocol conversion method includes: (a) receiving a first transport stream of an ATSC broadcast standard or a second transport stream of a DVB broadcast standard to determine a protocol conversion pattern; (b) extracting, as a broadcast protocol, first PSIP/PSI data from the first transport stream when the protocol conversion pattern is PSIP-to-SI conversion, or extracting first SI/PSI data from the second transport stream when the protocol conversion pattern is SI-to-PSIP conversion; (c) reconstructing the first PSIP/PSI data to a table suitable for a broadcast protocol of the DVB broadcast standard to generate second SI/PSI data, or reconstructing the first SI/PSI data to a table suitable for a broadcast protocol of the ATSC broadcast standard to generate second PSIP/PSI data; and (d) multiplexing the second SI/PSI data and the first transport stream having the first PSIP/PSI extracted therefrom, or multiplexing the second PSIP/PSI data and the second transport stream having the first SI/PSI data extracted therefrom.

Preferably, the first PSIP/PSI data and the first SI/PSI data extracted are sorted and stored in a database.

In a third aspect of the present invention, there is provided a system for digital broadcast protocol conversion including: a first protocol extractor for extracting a first broadcast protocol representing program information and system information from a first transport stream of a first digital broadcast standard; a second protocol extractor for extracting a second broadcast protocol representing program information and system information from a second transport stream of a second digital broadcast standard; and a protocol converter for reconstructing the first broadcast protocol into a broadcast protocol of the second digital broadcast standard to generate a third broadcast protocol, or reconstructing the second protocol into a broadcast protocol of the first digital broadcast standard to generate a fourth broadcast protocol; and a multiplexer for multiplexing the fourth broadcast protocol and the first transport stream having the first broadcast protocol extracted therefrom by the first protocol extractor, or multiplexing the third broadcast protocol and the second transport stream having the second broadcast protocol extracted therefrom by the second protocol extractor.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Hereinafter, a detailed description will be given to a broadcast protocol conversion system and method according to an embodiment of the present invention with reference to the accompanying drawings.

Now, the broadcast protocol conversion system according to the embodiment of the present invention will be described with reference to FIG. 1.

Figure 1:
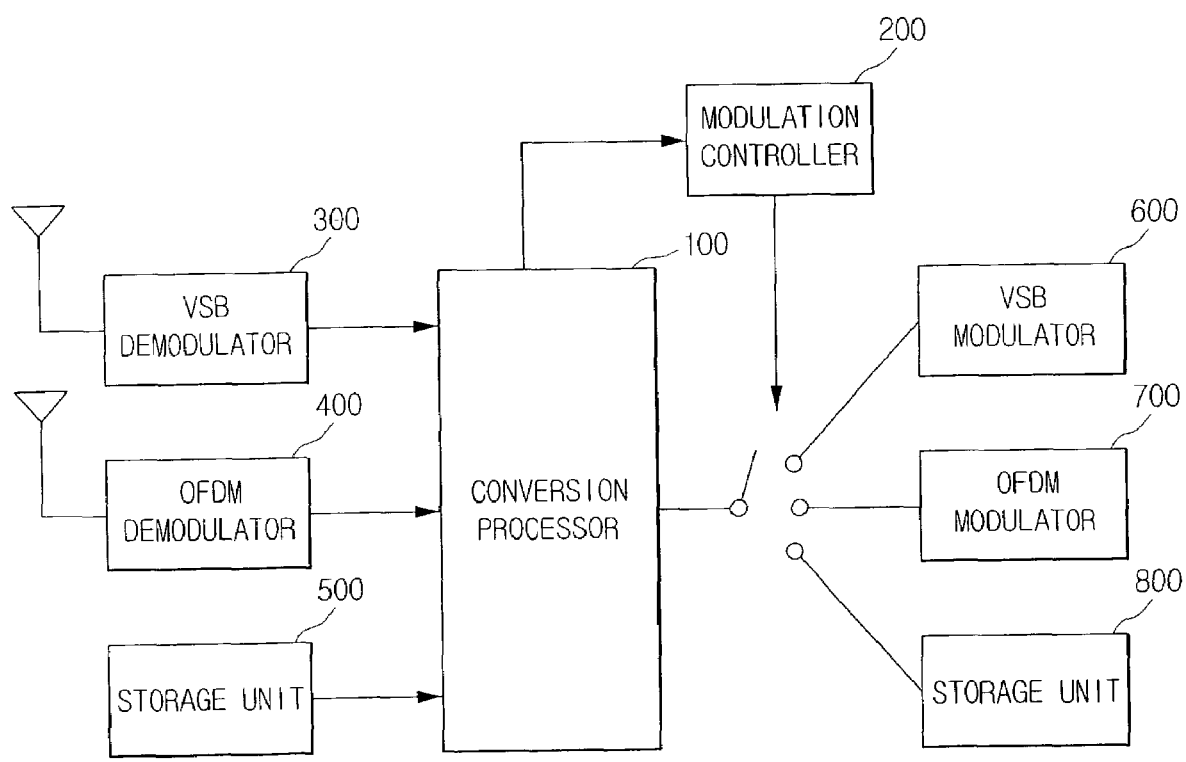
FIG. 1 is a block diagram showing a broadcast protocol conversion system in accordance with an embodiment of the present invention.

FIG. 1 is a block diagram showing a broadcast protocol conversion system in accordance with the embodiment of the present invention.

The broadcast protocol conversion system according to the embodiment of the present invention comprises, as shown in FIG. 1, a conversion processor 100 and a modulation controller 200. The broadcast protocol conversion system further comprises a vestigial side band (VSB) demodulator 300, an orthogonal frequency division multiplexing (OFDM) demodulator 400, and a storage unit 500, for sending a demodulated broadcast transport stream (hereinafter, referred to as "TS") to the conversion processor 100; and a VSB modulator 600, an OFDM modulator 700, and a storage unit 800, for sending or storing the TS output from the conversion processor 100.

More specifically, the VSB demodulator 300 demodulates a digital broadcasting signal produced in the ATSC broadcast standard and received via an antenna, and outputs a broadcast TS of the ATSC broadcast standard. The OFDM demodulator 400 demodulates a digital broadcasting signal produced in the DVB broadcast standard and received via the antenna, and outputs a broadcast TS of the DVB broadcast standard. The storage unit 500 stores the broadcast TS of the ATSC/DVB broadcast standard and sends it to the conversion processor 100.

The conversion processor 100 extracts a broadcast protocol from the broadcast TS of the ATSC/DVB broadcast standard received from the VSB demodulator 300, the OFDM demodulator 400, and the storage unit 500, converts the extracted broadcast protocol, and then outputs the converted broadcast protocol and the rest of the extracted broadcast TS. The modulation controller 200 receives information about the determined output type of the broadcast TS from the conversion processor 100 and controls the output type of the broadcast TS output from the conversion processor 100. The broadcast TS output from the conversion processor 100 is transferred to the VSB modulator 600, the OFDM modulator 700, and the storage unit 800, under the control of the modulation controller 200.

The VSB modulator 600 modulates the broadcast TS output from the conversion processor 100 in the ATSC standard and sends it to subscribers, while the OFDM modulator 700 modulates the broadcast TS output from the conversion processor 100 in the DVB standard and sends it to the subscribers. The storage unit 800 re-stores the broadcast TS output from the conversion processor 100, and the storage unit 800 may be physically the same as or different from the storage unit 500.

Now, the conversion processor 100 according to the embodiment of the present invention will be described in detail with reference to FIG. 2.

Figure 2:
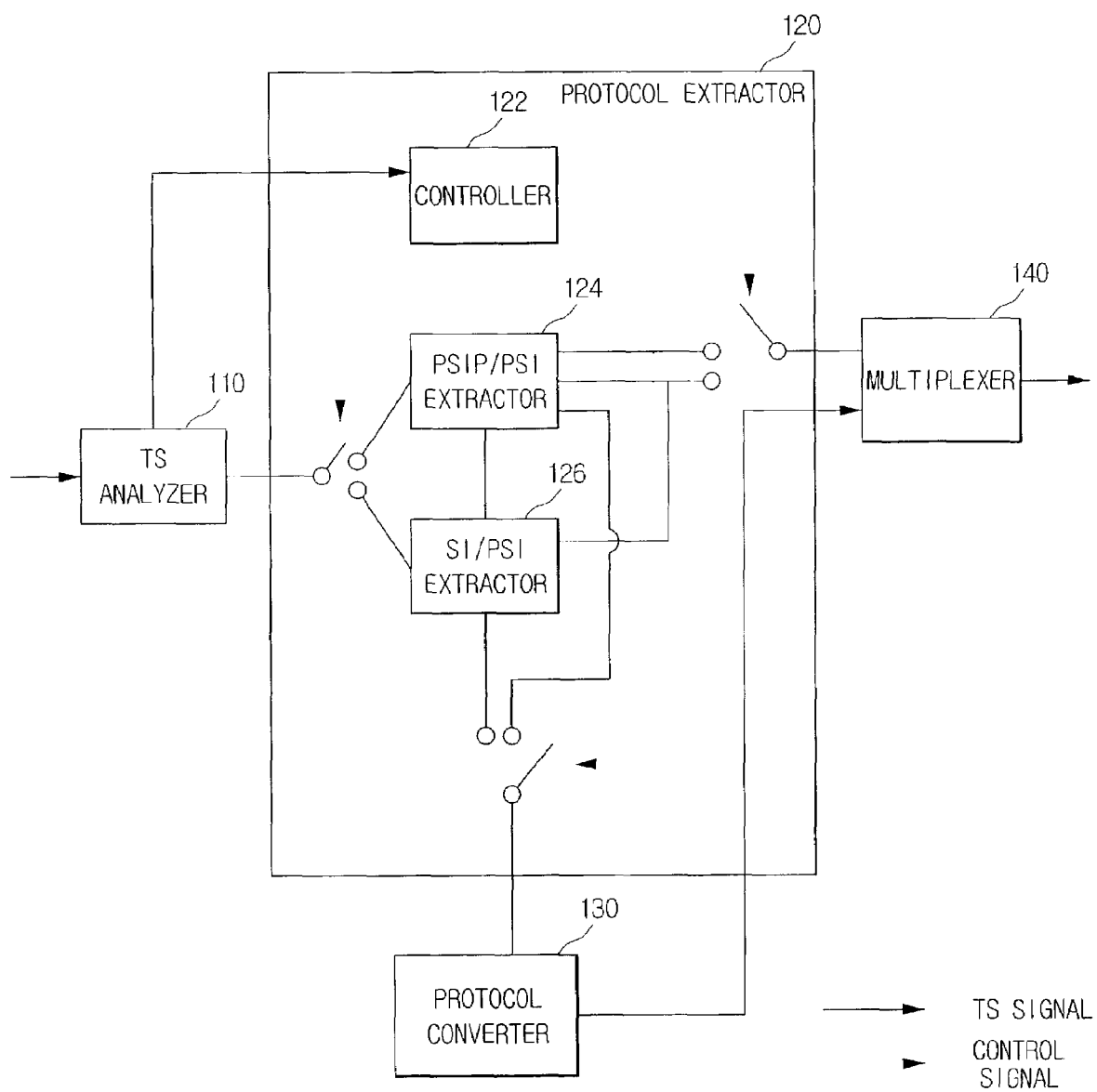
FIG. 2 is a block diagram showing a conversion processor of the broadcast protocol conversion system in accordance with the embodiment of the present invention.

FIG. 2 is a block diagram showing the conversion processor of the broadcast protocol conversion system in accordance with the embodiment of the present invention.

The conversion processor 100 comprises, as shown in FIG. 2, a TS analyzer 110, a protocol extractor 120, a protocol converter 130, and a multiplexer 140. The protocol extractor 120 comprises a controller 122, a PSIP/PSI extractor 124, and an SI/PSI extractor 126.

The TS analyzer 110 analyzes the broadcast TS received from the VSB demodulator 300, the OFDM demodulator 400, or the storage unit 500, to determine a broadcast protocol conversion pattern and to send it to the protocol extractor 120. More specifically, the TS analyzer 100 determines a protocol conversion pattern from PSIP data, i.e., a broadcast protocol of the broadcast TS produced in the ATSC broadcast that is standard to SI data, i.e., a DVB broadcast protocol, or from SI data, i.e., a broadcast protocol of the broadcast TS produced in the DVB broadcast that is standard to PSIP data.

The controller 122 of the protocol extractor 120 controls the I/O of the PSIP/PSI and SI/PSI extractors 124 and 126 according to the conversion pattern determined by the TS analyzer 110. More specifically, the input broadcast TS is transferred to the PSIP/PSI extractor 124 for PSIP-to-SI conversion, or to the SI/PSI extractor 126 for SI-to-PSIP conversion.

The PSIP/PSI extractor 124 demultiplexes the broadcast TS of the ATSC broadcast standard to extract PSIP/PSI data, and sends the extracted PSIP/PSI data to the protocol converter 130 under the control of the controller 122. Likewise, the SI/PSI extractor 126 demultiplexes the broadcast TS of the DVB broadcast standard to extract SI/PSI data, and sends the extracted SI/PSI data to the protocol converter 130 under the control of the controller 122. The PSIP/PSI and SI/PSI extractors 124 and 126 send the rest of the broadcast TS other than the PSIP/PSI and SI/PSI data to the multiplexer 140.

When the extracted data are PSIP/PSI, the protocol converter 130 converts PSIP data to SI data to reconstruct PSI data, and outputs the reconstructed PSI data to the multiplexer 140. When the extracted data are SI/PSI data, the protocol converter 130 converts SI data to PSIP data to reconstruct PSI data, and outputs the reconstructed PSI data to the multiplexer 140. The multiplexer 140 multiplexes the converted broadcast protocol from the protocol converter 130 and the rest of the broadcast TS having the broadcast protocol extracted therefrom.

Next, the protocol converter will be described in detail with reference to FIG. 3.

Figure 3:
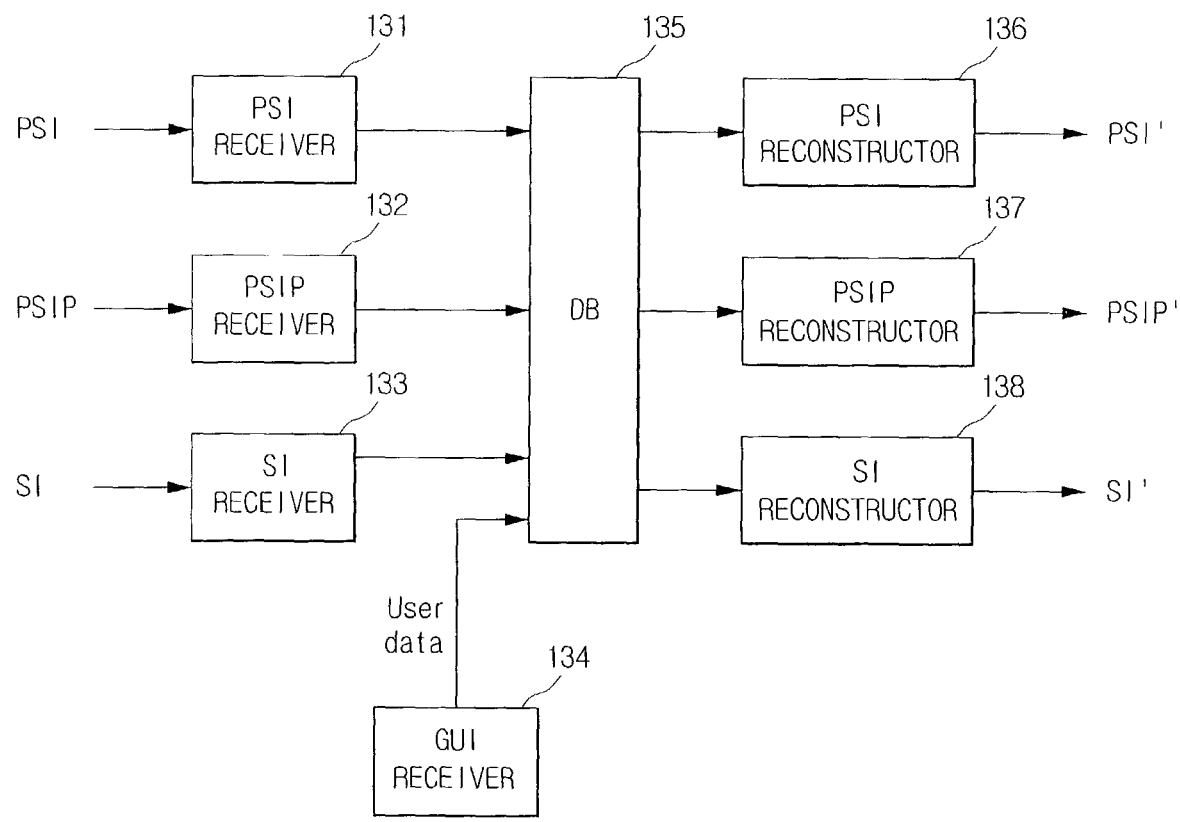
FIG. 3 is a block diagram showing a protocol converter of the broadcast protocol conversion system in accordance with the embodiment of the present invention.

FIG. 3 is a block diagram showing the protocol converter of the broadcast protocol conversion system in accordance with the embodiment of the present invention.

The protocol converter 130 comprises, as shown in FIG. 3, PSI, PSIP, and SI receivers 131, 132, and 133; a GUI (Graphic User Interface) receiver 134; a database DB 135; and PSI, PSIP, and PSI reconstructors 136, 137, and 138.

The PSI receiver 131 analyzes the extracted PSI data from the PSIP/PSI extractor 124 or the SI/PSI extractor 126, and sends them to the database 135. The PSIP and SI receivers 132 and 133 analyze the extracted PSIP data from the PSIP/PSI extractor 124 and the extracted SI data from the SI/PSI extractor 126, respectively, and send them to the database 135. The GUI receiver 134 receives user data necessary for generation of the PSI/PSIP/SI data from the system operator, and sends them to the database.

The database 135 sorts and stores the PSI, PSIP, and SI data received from the PSI, PSIP, and SI receivers 131, 132, and 133, and the user data from the GUI receiver 135, according to the respective standards. The PSI, PSIP, and SI reconstructors 136, 137, and 138 receive necessary data from the database to construct a table for the respective standards, and output the table to the multiplexer 140.

For example, for PSIP-to-SI conversion, the SI reconstructor 138 reconstructs the PSIP data received from the PSIP receiver 132 and stored in the database 135 into SI' data with a table for the SI standard, and sends the SI' data to the multiplexer 140. The PSI reconstructor 136 reconstructs the PSI data received from the PSI receiver 131 and stored in the database 135 into PSI' data, and sends the PSI' data to the multiplexer 140. The multiplexer 140 multiplexes the SI' and PSI' data and the rest of the transport TS having the broadcast protocol extracted therefrom. Thus the broadcast protocol of the transport TS is converted from PSIP to SI.

Likewise, for SI-to-PSIP conversion, the PSIP reconstructor 137 and the PSI reconstructor 136 reconstruct the SI and PSI data stored in the database 135 into PSIP' and PSI' data, respectively. The PSIP' and PSI' data are then multiplexed at the multiplexer 140. The SI-to-PSIP conversion is similar to the PSIP-to-SI conversion and will not be described in detail.

Figure 4:
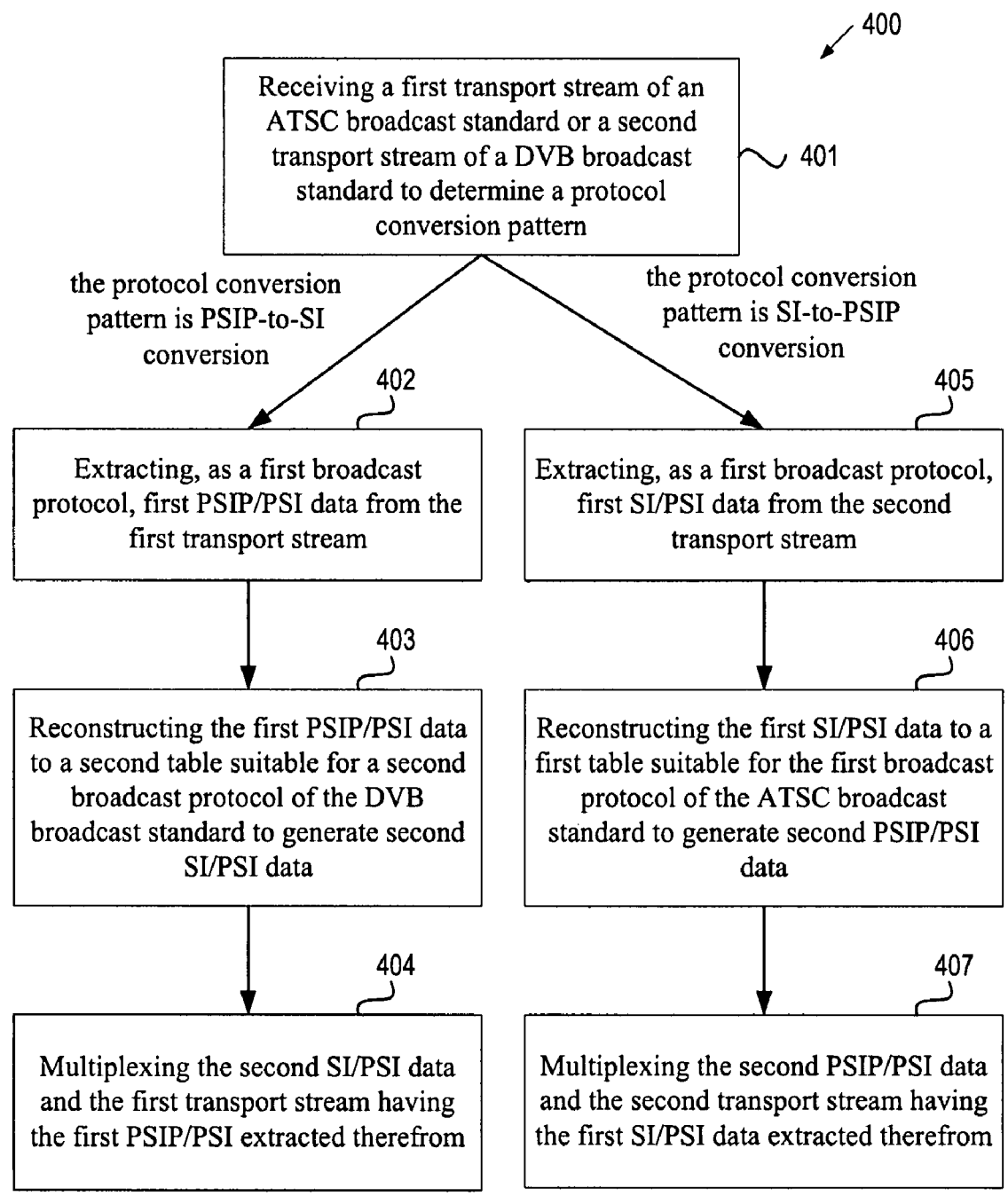
FIG. 4 is a flow chart showing a process of digital broadcast protocol conversion.

FIG 4 is a flow chart showing a process 400 of digital broadcast protocol conversion. At block 401, a first transport stream of an ATSC broadcast standard or a second transport stream of a DVB broadcast standard is received to determine a protocol conversion pattern. When the protocol conversion pattern is a SI-to-PSIP conversion, process 400 proceeds to blocks 402-404. At block 402, first PSIP/PSI data from the first transport stream is extracted as a first broadcast protocol. At block 403, the first PSIP/PSI data is reconstructed to a second table suitable for a second broadcast protocol of the DVB broadcast standard to generate second SI/PSI data. At block 404, the second SI/PSI data and the first transport stream having the first PSIP/PSI extracted therefrom are multiplexed. When the protocol conversion pattern is PSIP-to-SI conversion, process 400 proceeds to blocks 405-407. At block 405, first SI/PSI data from the second transport stream is extracted as the first broadcast protocol. At block 406, the first SI/PSI data is reconstructed to a first table suitable for the first broadcast protocol of the ATSC broadcast standard to generate second PSIP/PSI data. At block 407, the second PSIP/PSI data and the second transport stream having the first SIIPSI data extracted therefrom are multiplexed.

Although broadcast protocol conversions between ATSC and DVB broadcast standards have been described in this embodiment, the present invention may also be applied to other broadcast protocol conversions between different broadcast standards, other than ATSC or DVB.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

According to the present invention, the broadcast protocol of the transport stream may be converted between ATSC and DVB broadcast standards in real time, so that contents produced in a specific standard may be used in a system of a different standard. In addition, the contents stored in a storage unit may also be used in a broadcast system of a different standard.

What is claimed is:

1. A system for digital broadcast protocol conversion, comprising:
    a first protocol extractor for demultiplexing a transport stream of an ATSC (Advanced Television Systems Committee) broadcast standard to extract first PSIP (Program and System Information Protocol) data as a first broadcast protocol, the first protocol extractor further extracting first PSI data corresponding to the first PSIP data;
    a second protocol extractor for demultiplexing a transport stream of a DVB (Digital Video Broadcasting) broadcast standard to extract first SI (System Information) data as a second broadcast protocol, the second protocol extractor further extracting second PSI data corresponding to the first SI data;
    a protocol converter for receiving one of the first PSIP data from the first protocol extractor and the first SI data from the second protocol extractor to produce a converted protocol, the protocol converter converting the first PSIP data to second SI data corresponding to the second broadcast protocol of the DVB broadcast standard, or converting the first SI data to second PSIP data corresponding to the first broadcast protocol of the ATSC broadcast standard, wherein the protocol converter further reconstructs the first PSI data to produce resulting PSI data when converting the first PSIP data into resulting SI data, or reconstructs the second PSI data to produce the resulting PSI data when converting the first SI data to resulting PSIP data; and
    a multiplexer for multiplexing the converted protocol with the transport stream, from which one of the first broadcast protocol and the second broadcast protocol has been extracted;
    wherein the protocol converter further comprises:
    a database for storing the first PSIP data, the first SI data, and one of the first PSI data and the second PSI data, and
    PSIP, SI, and PSI reconstructors for respectively reconstructing the first PSIP data, the first SI data, and one of the first PSI data and the second PSI data stored in the database to produce the resulting PSIP data, the resulting SI data, and the resulting PSI data.

2. The system as claimed in claim 1, further comprising:
    a transport stream analyzer for receiving the transport streams of the ATSC and DVB broadcast standards to determine a broadcast protocol conversion pattern, and sending the transport streams to the first or second protocol extractor.

3. The system as claimed in claim 2, further comprising:
    a controller for controlling a data transport path according to the broadcast protocol conversion pattern determined by the transport stream analyzer, the data transport path comprising:
    a path for sending the transport stream from the transport stream analyzer to the first or second protocol extractor;
    a path for sending the first PSIP data or the first SI data from the first or second protocol extractor to the protocol converter; and a path for sending the second SI data or the second PSIP data from the first or second protocol extractor to the multiplexer.

4. The system as claimed in claim 1, wherein the protocol converter further comprises:

a GUI (Graphic User Interface) receiver for receiving user data necessary for reconstruction of the PSIP, SI, and PSI data.

5. The system as claimed in claim 1, further comprising:

a storage unit for storing the transport stream of the ATSC broadcast standard or the DVB broadcast standard and sending it to the first or second protocol extractor.

6. A method for digital broadcast protocol conversion, comprising:

(a) receiving a first transport stream of an ATSC broadcast standard or a second transport stream of a DVB broadcast standard to determine a protocol conversion pattern;

(b) extracting, as a first broadcast protocol, first PSIP data from the first transport stream when the protocol conversion pattern is PSIP-to-SI conversion, or extracting first SI data from the second transport stream when the protocol conversion pattern is SI-to-PSIP conversion;

(c) producing a converted protocol by reconstructing the first PSIP data to a second table suitable for a second broadcast protocol of the DVB broadcast standard to generate second SI data, or reconstructing the first SI data to a first table suitable for the first broadcast protocol of the ATSC broadcast standard to generate second PSIP data; and (d) multiplexing the converted protocol with the transport stream, from which one of the first broadcast protocol and the second broadcast protocol has been extracted, wherein the step (b) further comprises extracting first PSI data corresponding to the first PSIP data from the first transport stream, or extracting second PSI data corresponding to the first SI data;

the step (c) further comprises reconstructing the first PSI data to the second table to generate third PSI data, or reconstructing the second PSI data to the first table to generate fourth PSI data; and the step (d) further comprises multiplexing the second SI data, the third PSI data, and the first transport stream from which the first PSIP have been extracted, or multiplexing the second PSIP data, the fourth PSI data, and the second transport stream from which the first SI data have been extracted.

7. The method as claimed in claim 6, wherein the step (b) further comprises:

sorting and storing the extracted first PSIP and SI data in a database.

8. The method as claimed in claim 7, wherein the database further stores user data necessary for reconstruction of the second PSIP data and the second SI data.

* * * * *